(12) United States Patent
Akaboshi (10) Patent No.: US 8,224,834 B2
(45) Date of Patent: Jul. 17, 2012

(54) DATABASE MESSAGE ANALYSIS SUPPORT TECHNIQUE

(75) Inventor: Naoki Akaboshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 321 days.

(21) Appl. No.: 12/716,374

(22) Filed: Mar. 3, 2010

(65) Prior Publication Data

US 2010/0262604 A1 Oct. 14, 2010

(30) Foreign Application Priority Data

Apr. 13, 2009 (JP) ................. 2009-097403

(51) Int. Cl.
G06F 7/00 (2006.01)
G06F 17/30 (2006.01)
(52) U.S. Cl. ...................... 707/759; 707/769
(58) Field of Classification Search .............. 707/687, 707/705, 713, 758, 759, 769
See application file for complete search history.

(56) References Cited

U.S. PATENT DOCUMENTS

2002/0138337 A1* 9/2002 Yanase et al. ............ 705/10
2006/0195297 A1 8/2006 Kubota et al.

FOREIGN PATENT DOCUMENTS

| JP | 1-286038 | 11/1989 |
|---|---|---|
| JP | 9-305461 | 11/1997 |
| JP | 2001-175678 | 6/2001 |
| JP | 2004-240766 | 8/2004 |
| JP | 2006-236280 | 9/2006 |
| JP | 2006-277179 | 10/2006 |

OTHER PUBLICATIONS

Akasaka Norio, "Oracle genuine database management tool", Oracle Enterprise Manager Quick-actiong manual, Chapter III, DB Magazine, vol. 11, No. 4, Shoeisha, Co., Ltd,. Aug. 1, 2001, pp. 238-245.

* cited by examiner

Primary Examiner — Marc Somers
(74) Attorney, Agent, or Firm — Staas & Halsey LLP (57) ABSTRACT

A method includes: collecting message sequences including a series of messages issued in response to one processing request; classifying the collected message sequences into groups of the message sequences whose simplified message sequences generated by excluding words other than reserved words from a database message that is a message including a SQL sentence are identical, wherein the database message is included in the series of messages; generating, for each group, a normalized expression including the reserved words in the database message as fixed character strings and arbitrary character strings replaced with portions other than the fixed character strings in the database message, for the database message included in the message sequence belonging to the group; and generating a rule for converting the database message considered to be identical with the normalized expression into a series of fixed character strings included in the normalized expression.

5 Claims, 9 Drawing Sheets

| SEQUENCE ID | MESSAGE SEQUENCE | GROUP ID |
|---|---|---|
| 1 | HTTP XXX<br>IIOP ABC<br>DB SELECT * FROM Table WHERE id='1234'<br>DB UPDATE Table | 1 |
| 2 | HTTP XXX<br>IIOP ABC<br>DB SELECT * FROM Table WHERE id='1478' and address='Tokyo'<br>DB UPDATE Table | 1 |
| 3 | HTTP XXX<br>IIOP ABC<br>DB SELECT * FROM Table WHERE id='2211' and address='Osaka' or address='Kyoto'<br>DB UPDATE Table | 1 |
| ... | ... | ... |

FIG.2

| GROUP ID | RESERVED WORD EXPRESSION MESSAGE SEQUENCE |
|---|---|
| 1 | HTTP XXX<br>IIOP ABC<br>DB SELECT FROM WHERE<br>DB UPDATE |
| ... | ... |
| ... | ... |

FIG.4

| GROUP ID | CONVERSION RULE |
|---|---|
| 1 | SELECT * FROM Table WHERE . * → SELECT * FROM Table WHERE |
| ... | ... |
| ... | ... |

(FIRST DATABASE MESSAGE IN SEQUENCE 1): SELECT * FROM Table WHERE id='1234'

(FIRST DATABASE MESSAGE IN SEQUENCE 2): SELECT * FROM Table WHERE id='1478' and address='Tokyo'

(FIRST DATABASE MESSAGE IN SEQUENCE 3): SELECT * FROM Table WHERE id='2211' and address='Osaka' or address='Kyoto'

NORMALIZED EXPRESSION: SELECT .* FROM .* WHERE .*

FIG.9

SELECT (.*) FROM (.*) WHERE (.*)
         $0        $1         $2

FIG.11A

| | $0 | $1 | $2 |
|---|---|---|---|
| SEQUENCE 1 | * | Table | id='1234' |
| SEQUENCE 2 | * | Table | id='1478' and address='Tokyo' |
| SEQUENCE 3 | * | Table | id='2211' and address='Osaka' or address='Kyoto' |

DATABASE MESSAGE ANALYSIS SUPPORT TECHNIQUE

CROSS-REFERENCE TO RELATED APPLICATIONS

This application is based upon and claims the benefit of priority of the prior Japanese Patent Application No. 2009-097403, filed on Apr. 13, 2009, the entire contents of which are incorporated herein by reference.

FIELD

This technique relates to a technique for analyzing database messages.

BACKGROUND

Figure 13:
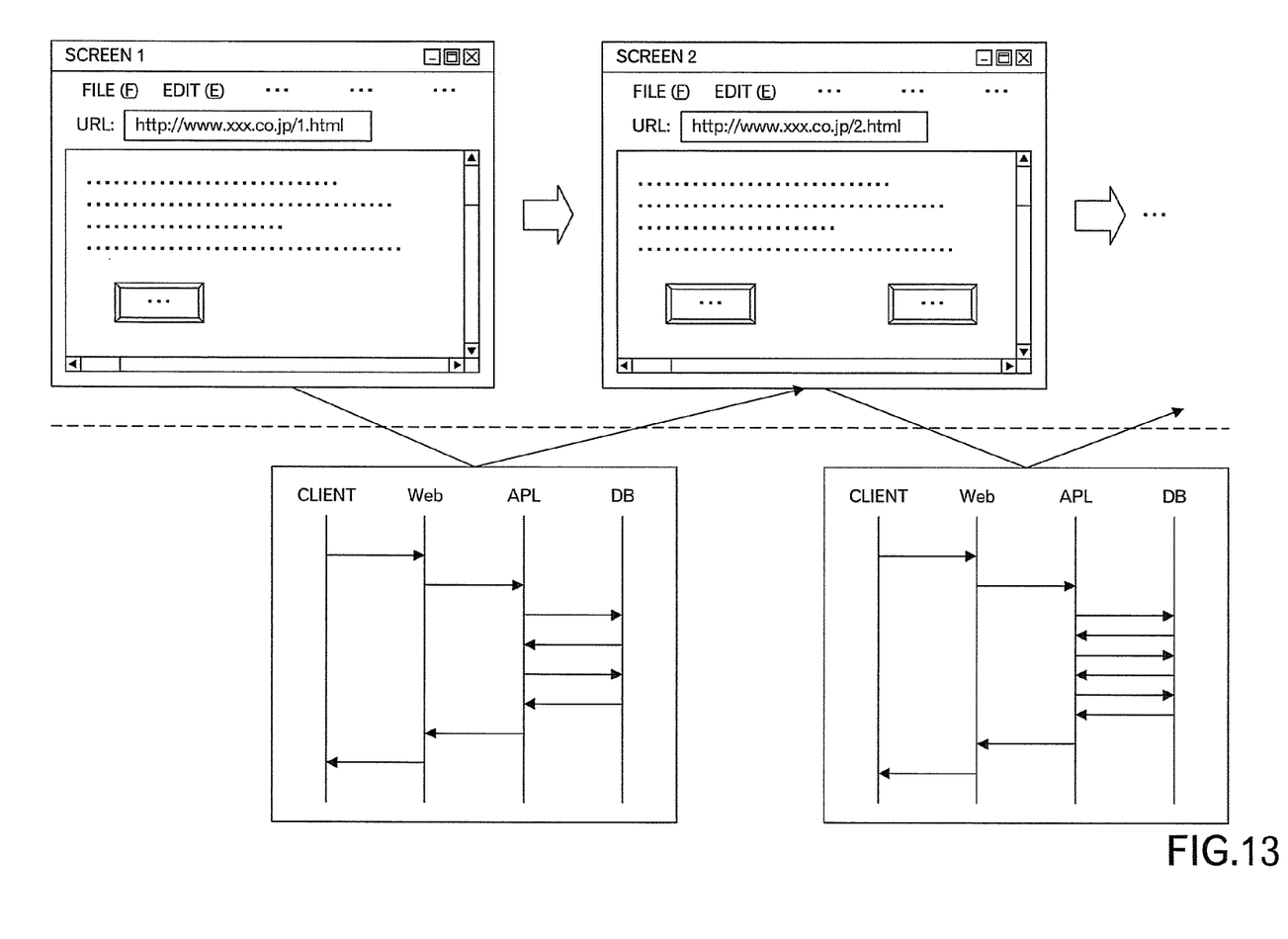
FIG. 13 is a diagram depicting a flow of messages exchanged between servers in a conventional system.

For example, when a system having, for example, plural servers receives a request from a client, messages are exchanged between the servers, as depicted in FIG. 13, to advance the processing. Incidentally, FIG. 13 depicts the system including a Web server, an application (APL) server, and a database (DB) server. Furthermore, a sequence of the messages exchanged between the servers is different according to the request from the client, for example.

For example, when there is a message including, as a parameter, an employee number, this message has the same number of variations as the number of employees. However, an analyst who analyzes the system may want to handle such variations of the message as one kind of message. In order to resolve such a problem, there is a technique (e.g. Japanese laid-open patent publication No. 2006-236280) to convert the grain size of the message according to a predefined conversion rule. According to such a technique, it is possible to convert the messages so as to leave only a required portion, and it is also possible to appropriately judge the identity of the messages.

However, there are variations in a search formula by, for example, Structured Query Language, and the search formula may vary for each job. Therefore, it is very difficult for a person to manually prepare rules to convert the grain size of the database messages including an SQL sentence. Incidentally, there is no conventional technique to automatically generate rules to convert the grain size of the database messages.

SUMMARY

According to an aspect of this technique, a database message analysis support method includes: collecting a message sequence including messages issued in response to one processing request; classifying the collected message sequence into groups of the message sequences whose simplified message sequences generated by excluding words other than predetermined reserved words from a database message that is a message including a Structured Query Language (SQL) sentence are identical, wherein said database message is included in said series of messages in said collected message sequence; generating, for each group, a normalized expression including the predetermined reserved words in the database message as fixed character strings and arbitrary character strings, which are replaced with portions other than the fixed character strings in the database message, for the database message included in the message sequence belonging to the group; and generating a rule for converting the database message considered to be identical with the normalized expression into a series of fixed character strings included in the normalized expression.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 1:
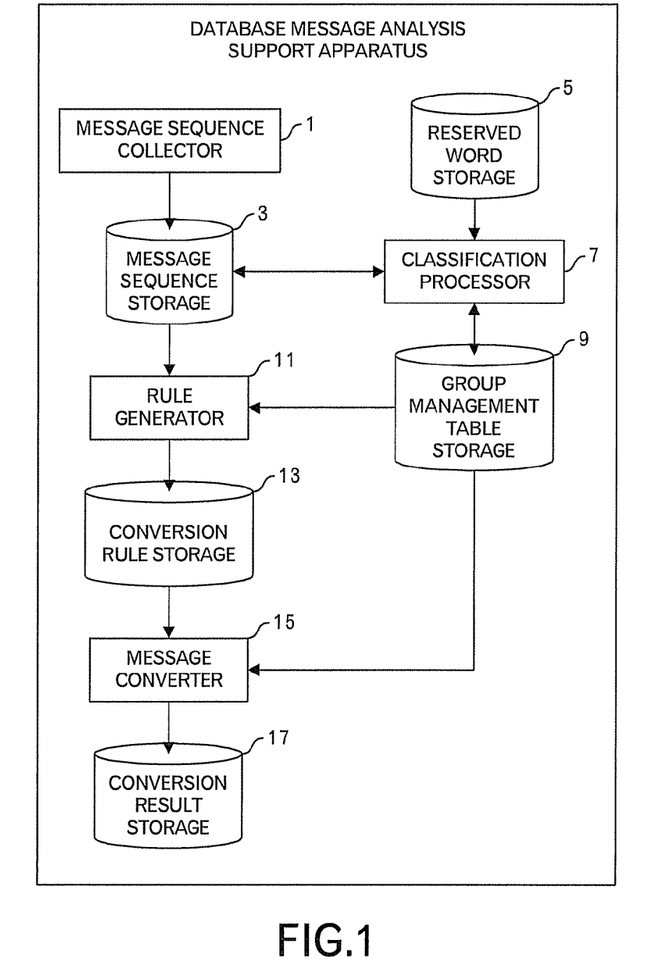
FIG. 1 is a functional block diagram of a database message analysis support apparatus in an embodiment of this technique.

FIG. 1 depicts a functional block diagram of a database message analysis support apparatus relating to one embodiment of this technique. The database message analysis support apparatus includes a message sequence collector 1, a message sequence storage 3, a reserved word storage 5, a classification processor 7, a group management table storage 9, a rule generator 11, a conversion rule storage 13, a message converter 15 and a conversion result storage 17. Incidentally, the database message analysis support apparatus is connected with a transaction processing system (not depicted) having plural servers such as the Web server, APL server and DB server.

The message sequence collector 1 collects message sequences, each including a series of messages issued in the transaction processing system in response to one processing request from a client, and stores the collected message sequences into the message sequence storage 3. The reserved word storage 5 stores reserved words preset in advance by the user. The classification processor 7 carries out a message sequent classification processing described later by using data stored in the message sequence storage 3, the reserved word storage 5 and the group management table storage 9, and registers the classification result into the message sequence storage 3, and registers information of the groups into the group management table 9. The rule generator 11 carries out a rule generation processing described later, by using data stored in the message sequence storage 3 and the group management table 9, and stores the generated conversion rule into the conversion rule storage 13. The message converter 15 receives database messages to be converted, coverts the database messages by using data stored in the group management table 9 and the conversion rule storage 13, and stores the database message after the conversion into the conversion result storage 17.

Figure 2:
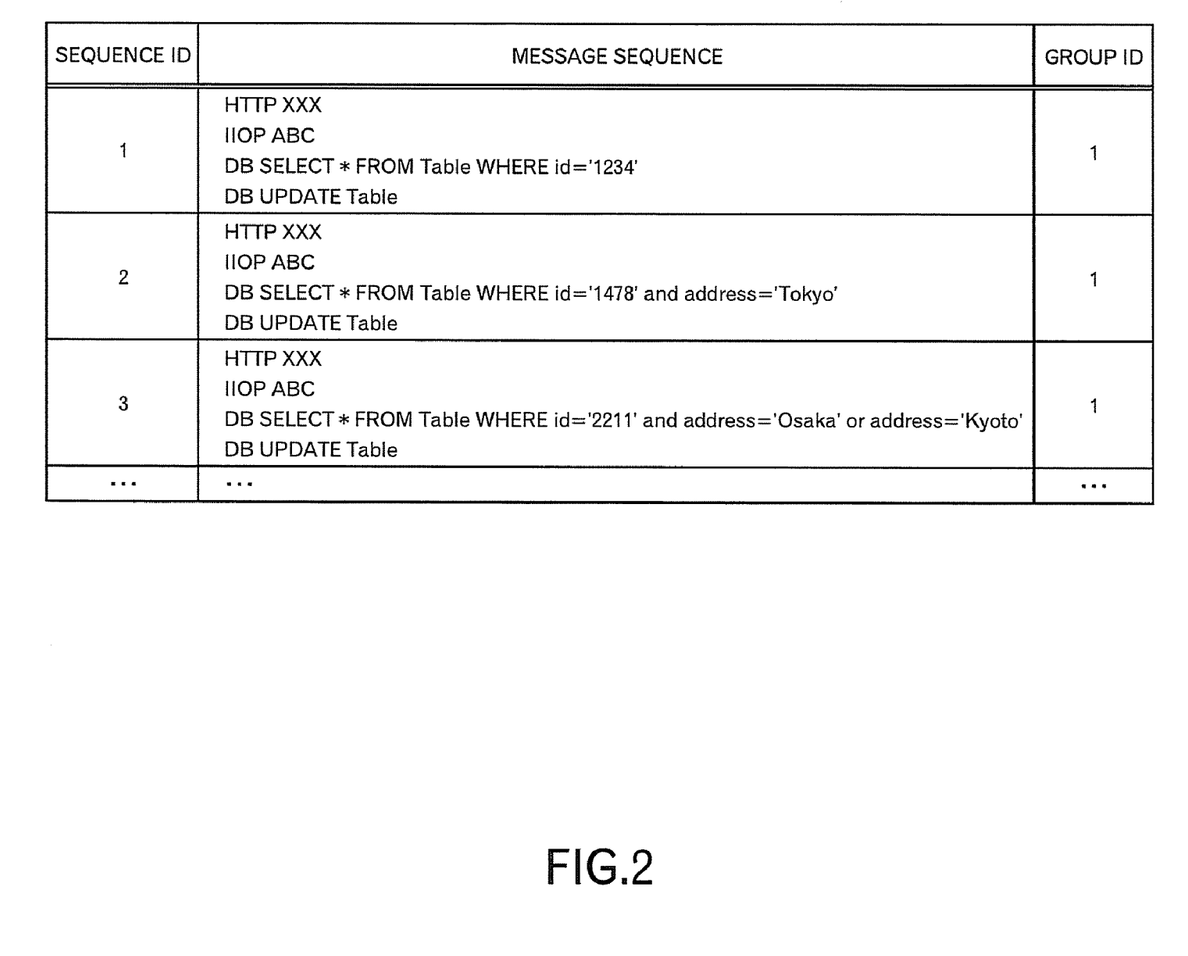
FIG. 2 is a diagram depicting an example of data stored in a message sequence storage.

In addition, FIG. 2 depicts an example of data stored in the message sequence storage 3. In the example of FIG. 2, a table in the message sequence storage 3 includes a column of a sequence ID, a column of a message sequence and a column of a group ID. Incidentally, various kinds of messages included in the message sequence are stored into the column of the message sequence. In addition, an ID of the group to which the message sequence belongs is set into the column of the group ID.

Figure 3:
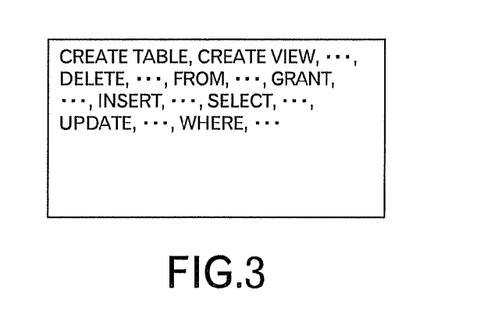
FIG. 3 is a diagram depicting an example of data stored in a reserved word storage.

In addition, FIG. 3 depicts an example of data stored in the reserved word storage 5. In the example of FIG. 3, the reserved word storage 5 stores, as the reserved word, "CREATE TABLE", "CREATE VIEW", "DELETE", "FROM", "GRANT", "INSERT", "SELECT", "UPDATE", "WHERE" and the like. Incidentally, the user registers the reserved words (e.g. "CREATE TABLE", "CREATE VIEW", "GRANT") of Data Definition Language (DDL) and the reserved words (e.g. "SELECT", "UPDATE", "INSERT", "DELETE") of Data Manipulation Language (DML), for example, into the reserved word storage 5, in advance. In addition, according to the instruction of the user, words such as "FROM" and "WHERE" are also registered into the reserved word storage 5, in addition to the reserved words of DDL and DML.

Figure 4:
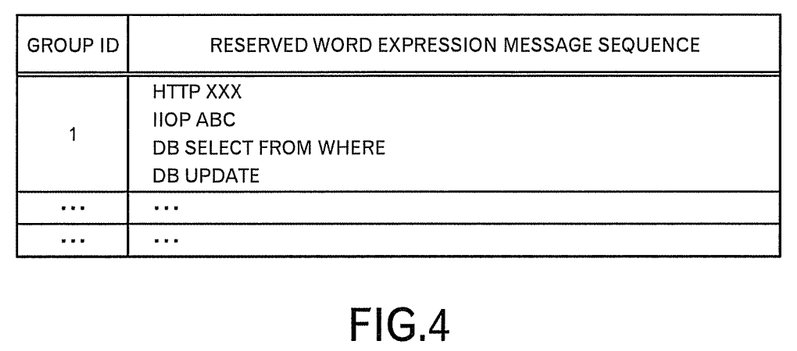
FIG. 4 is a diagram depicting an example of a group management table stored in a group management table storage.

In addition, FIG. 4 depicts an example of the group management table stored in the group management table storage 9. In the example of FIG. 4, the group management table includes a column of the group ID and a column of a reserved word expression message sequence (also called simplified message sequence). Namely, the group management table stores, for each group, the reserved word expression message sequence. Incidentally, in this embodiment, a message sequence after excluding words other than the reserved words stored in the reserved word storage 5 from the respective database messages is called "the reserved word expression message sequence".

Figure 5:
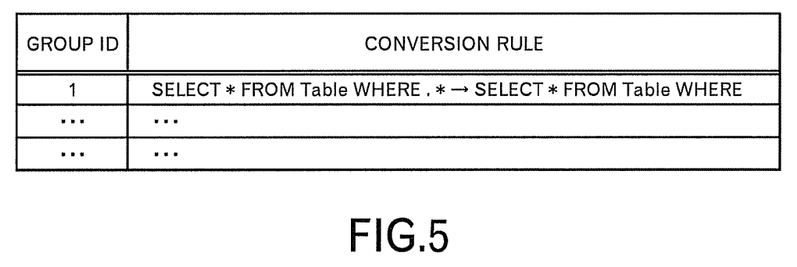
FIG. 5 is a diagram depicting an example of data stored in a conversion rule storage.

In addition, FIG. 5 depicts an example of data stored in the conversion rule storage 13. In the example of FIG. 5, a table in the conversion rule storage 13 includes a column of the group ID and a column of the conversion rule. For example, in FIG. 5, the conversion rule "SELECT * FROM Table WHERE .*→SELECT * FROM Table WHERE" of the group 1 represents a rule to convert a message, which belongs to the group 1 and is pertinent to a normalized expression "SELECT * FROM Table WHERE .*" into "SELECT * FROM Table WHERE".

Next, a processing of the database message analysis support apparatus will be explained by using FIGS. 6 to 12. First, a processing for generating the conversion rule will be explained by using FIGS. 6 to 11. For example, the database message analysis support apparatus carries out a processing as depicted in FIG. 6, periodically, or at an arbitrary timing.

Figure 6:
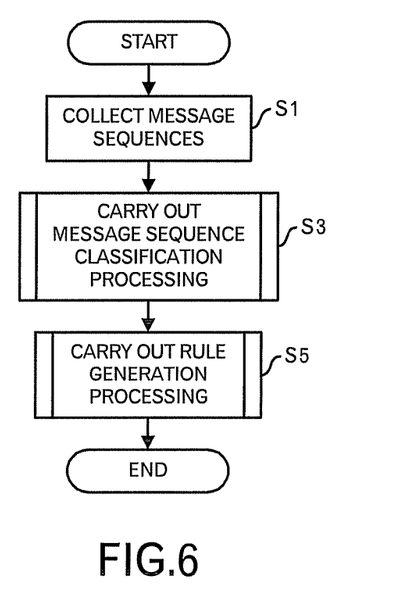
FIG. 6 is a diagram depicting a processing flow of a processing for converting a conversion rule.

First, the message sequence collector 1 collects message sequences from the transaction processing system, and stores the collected message sequences into the message sequence storage 3 (FIG. 6: step S1). Then, after collecting the message sequences from the transaction processing system, the classification processor 7 carries out a message sequence classification processing by using data stored in the message sequence storage 3, the reserved word storage 5 and the group management table storage 9 (step S3). This message sequence classification processing will be explained by using FIG. 7.

Figure 7:
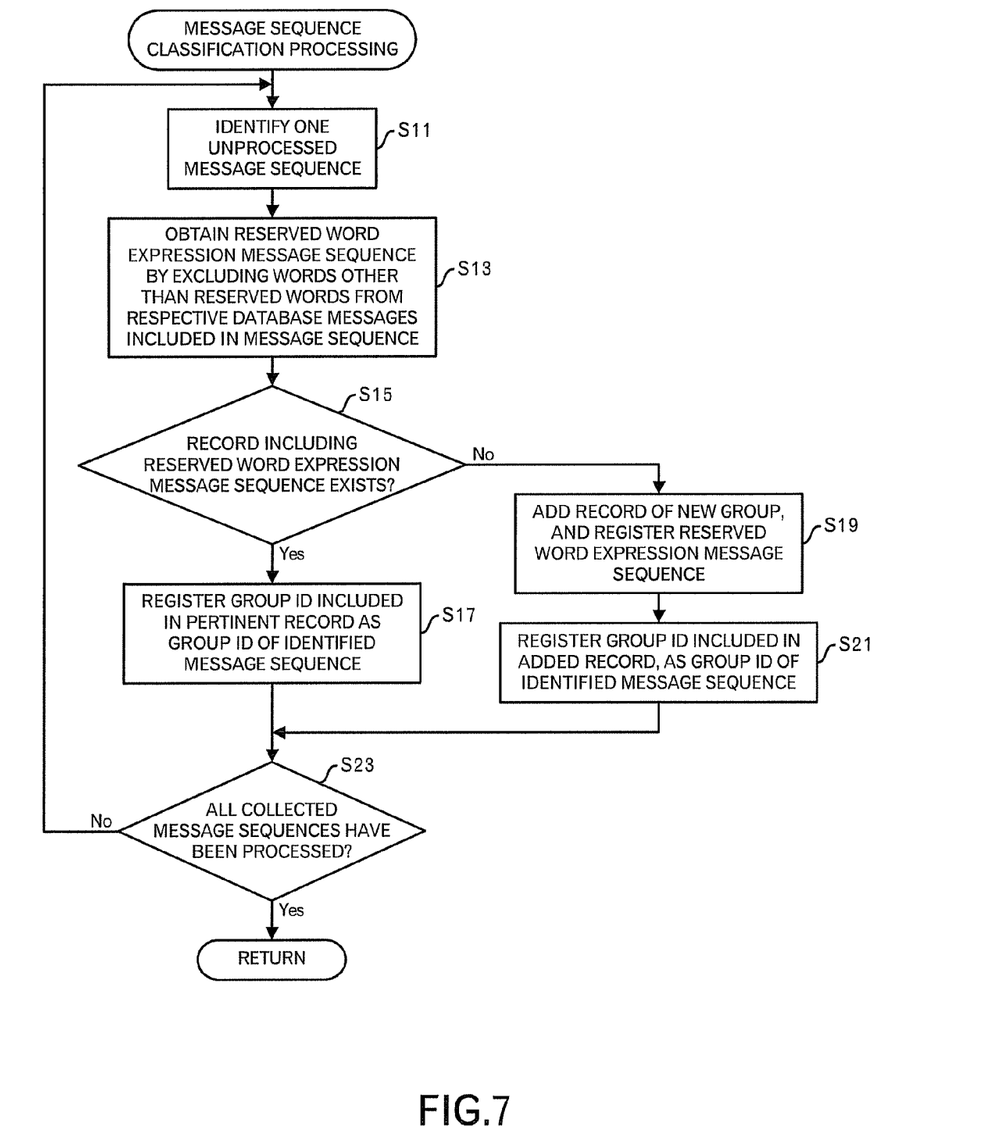
FIG. 7 is a diagram depicting a processing of a message sequence classification processing.

First, the classification processor 7 identifies one unprocessed message sequence among the collected message sequences stored in the message sequence storage 3 (FIG. 7: step S11). Then, the classification processor 7 excludes words other than the reserved words stored in the reserved word storage 5 from the respective database message included in the identified message sequence, to obtain the reserved word expression message sequence (step S13).

Then, the classification processor 7 judges whether or not a record including the obtained reserved word expression message sequence has been stored in the group management table storage 9 (step S15). When the record including the obtained reserved word expression message sequence has been stored in the group management table storage 9 (step S15: Yes route), the classification processor 7 registers, as the group ID of the identified message sequence, the group ID included in the record into the message sequence storage 3 (step S17). After that, the processing shifts to the processing of step S23.

On the other hand, when the record including the obtained reserved word expression message sequence has not been stored in the group management table storage 9 (step S15: No route), the classification processor 7 adds a record for a new group to the group management table storage 9, and sets the obtained reserved expression message sequence to the record (step S19). At this time, the classification processor 7 issues a new group ID, and sets the group ID to the added record. Then, the classification processor 7 registers the group ID included in the added record, as the group ID of the identified message sequence, into the message sequence storage 3 (step S21). After that, the processing shifts to the processing of the step S23.

Then, the classification processor 7 judges whether or not all of the collected message sequences have been processed (step S23). When the processing for all of the collected message sequences has been completed (step S23: Yes route), the processing returns to the calling source processing. On the other hand, when the processing for all of the collected message sequences has not been completed (step S23: No route), the processing returns to the processing of the step S11, and the aforementioned processing is repeated.

By carrying out the aforementioned processing, the collected message sequences can be categorized into groups of the message sequences whose reserved word expression message sequences are identical.

Returning to the explanation of FIG. 6, after carrying out the message sequence classification processing, the rule generator 11 carries out the rule generation processing by using data stored in the message sequence storage 3 and the group management table storage 9 (step S5). This rule generation processing will be explained by using FIGS. 8 to 11. Incidentally, when the step S5 is completed, the processing of FIG. 6 is completed.

Figure 8:
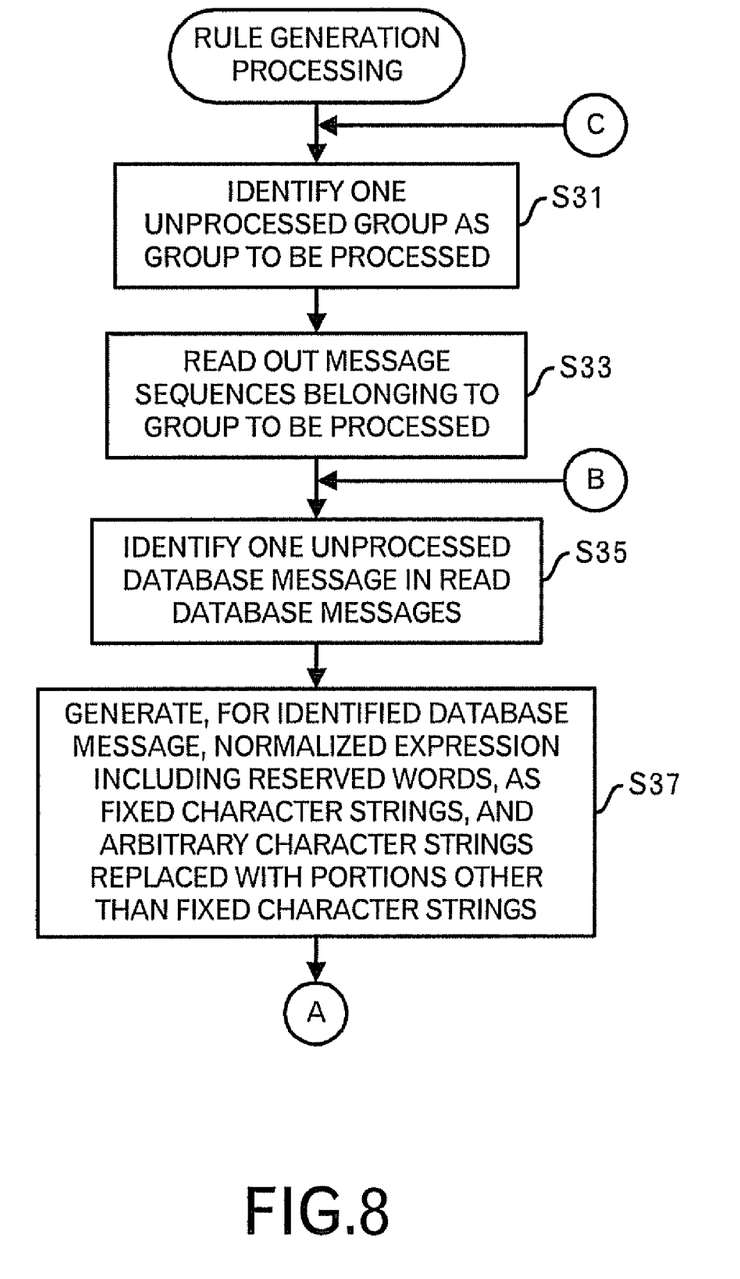
FIG. 8 is a diagram depicting a first portion of a processing flow of a rule generation processing.

First, the rule generator 11 identifies one unprocessed group, as a group to be processed, in the group management table storage 9 (FIG. 8: step S31). Then, the rule generator 11 reads out the message sequences belonging to the group to be processed, from the message sequence storage 3 (step S33).

Figure 9:
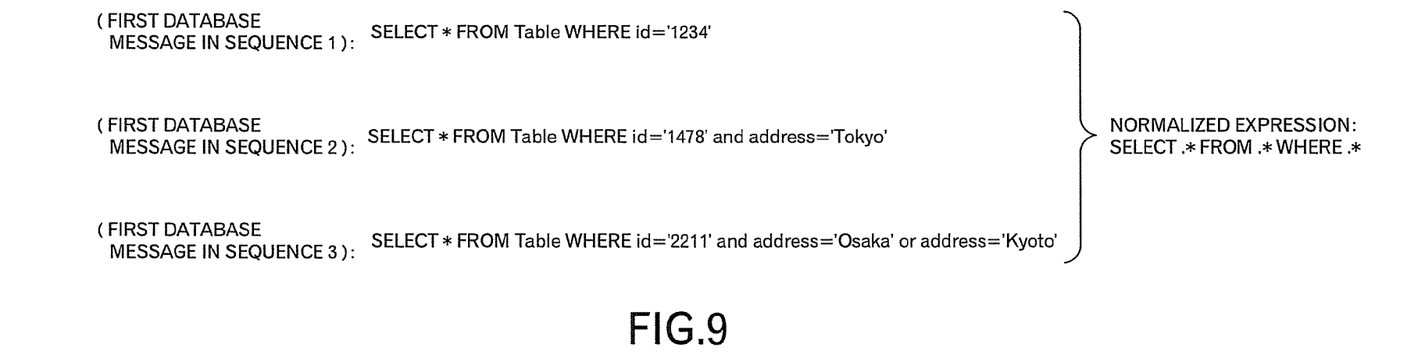
FIG. 9 is a diagram depicting an example of a normalized expression.

Then, the rule generator 11 identifies one unprocessed database message in the read message sequence (step S35). After that, the rule generator 11 generates, for the identified database message, a normalized expression including, as fixed character strings, the reserved words in the identified database message and arbitrary character strings replaced with portion other than the fixed character strings, and stores the generated normalized expression into a storage device such as a main memory, temporarily (step S37). For example, in a case where the data as depicted in FIG. 3 is stored in the reserved word storage 5, when the processing of this step is carried out for the first database message in the sequences 1, 2 and 3, the normalized expression "SELECT .* FROM .* WHERE .*" as depicted in FIG. 9 is generated. Incidentally, ".*" represents the arbitrary character strings, and other character strings may be used for this purpose. Then, the processing shifts to step S39 in FIG. 10 through a terminal A.

Figure 10:
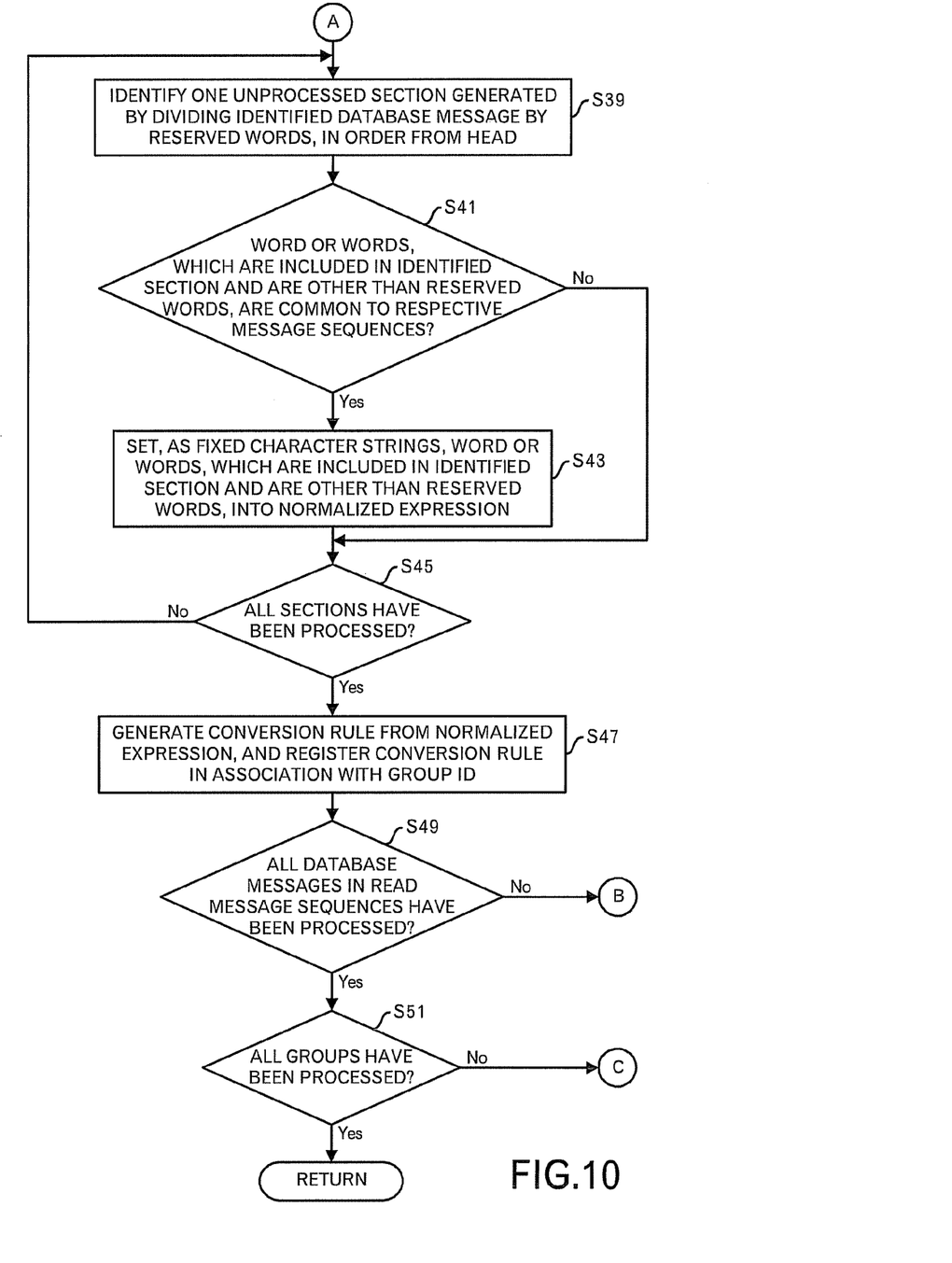
FIG. 10 is a diagram depicting a second portion of the processing flow of a rule generation processing.
Figure 11A:
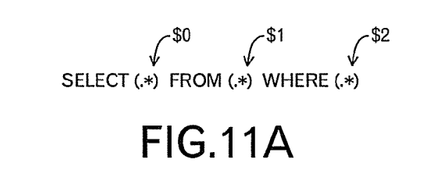
FIGS. 11A and 11B are diagrams to explain the rule generation processing.

Shifting to the explanation of FIG. 10 through the terminal A, the rule generator 11 identifies an unprocessed section among sections generated by dividing the identified database message by the reserved words, in order from the head (FIG. 10: step S39). For example, as depicted in FIG. 11A, "$0" represents a section between "SELECT" and "FROM", "$1" represents a section between "FROM" and "WHERE", and "$2" represents a section including "WHERE" and subsequent characters. Then, the section is identified in order of "$0", "$1" and "$2".

Figure 11B:
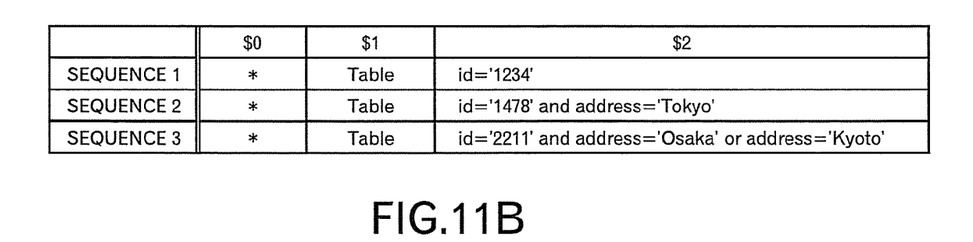

Then, the rule generator 11 judges whether or not the word or words, which are other than the reserved words and are included in the identified section, are common to the word or words in the respective read message sequences (step S41). For example, as depicted in FIG. 11B, all words in the section "$0" are "*", which is common to the respective message sequences. In addition, all words in the section "$1" are "Table", which is common to the respective message sequences. On the other hand, the words in the section "$2" are "id='1234'", "id='1478' and address='Tokyo'" and "id='2111' and address='Osaka' or address='Kyoto'", which are not common to the respective message sequences.

Then, when the word or words, which are other than the reserved words and are included in the identified section, are judged to be the word or words common to the respective message sequences (step S41: Yes route), the rule generator 11 sets the word or words, which are other than the reserved words and are included in the identified section, as the fixed character string, to the normalized expression (step S43). After that, the processing shifts to the processing of step S45.

On the other hand, when the word or words, which are other than the reserved words and are included in the identified section, are not the word or words common to the respective message sequences (step S41: No route), the processing of the step S43 is skipped, and the processing shifts to the step S45.

Then, the rule generator 11 judges whether or not all sections have been processed (step S45). When the processing for all sections has not been completed (step S45: No route), the processing returns to the step S39, and the aforementioned processing is repeated. On the other hand, when the processing for all sections has been completed (step S45: Yes route), the processing shifts to step S47. For example, when the aforementioned processing is carried out for the section "$0", "$1" and "$2", "SELECT .* FROM .* WHERE .*" depicted in the normalized expression is changed to "SELECT * FROM Table WHERE .*".

Then, the rule generator 11 generates a conversion rule from the normalized expression stored in the storage device, and registers the generated conversion rule in association with the group ID of the current group to be processed into the conversion rule storage 13 (step S47). For example, the conversion rule as depicted in FIG. 5 is registered.

Then, the rule generator 11 judges whether or not the processing for all database messages in the read message sequences has been completed (step S49). When the processing for all database messages in the read message sequences has not been completed (step S49: No route), the processing returns to the step S35 in FIG. 8 through the terminal B, and the aforementioned processing is repeated.

On the other hand, when the processing for all database messages in the read message sequences has been completed (step S49: Yes route), the rule generator 11 judges whether or not the processing for all groups in the group management table storage 9 has been completed (step S51). When the processing for all groups in the group management storage 9 has not been completed (step S51: No route), the processing returns to the step S31 in FIG. 8 through the terminal C, and the aforementioned processing is repeated.

On the other hand, when the processing for all groups in the group management table storage 9 has been completed (step S51: Yes route), the rule generation processing is completed and returns to the calling source.

By carrying out the aforementioned processing, the conversion rule to convert the grain size of the database message for each group, can be generated, automatically.

Next, a processing when the database message is converted will be explained by using FIG. 12. Incidentally, it is assumed that the conversion rules generated by the aforementioned processing have been stored in the conversion rule storage 13.

Figure 12:
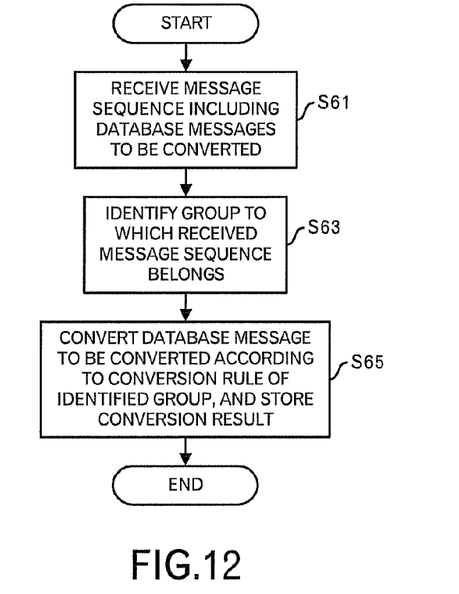
FIG. 12 is a diagram depicting a processing flow when the database message is converted.

First, the message converter 15 receives a new message sequence including the database message to be converted (FIG. 12: step S61). Then, the message converter 15 identifies a group belonging to the received message sequence (step S63). Specifically, the message converter 15 generates the reserved expression message sequence from the received message sequence, and identifies a group belonging to the received message sequence by searching the group management table storage 9 for the same reserved expression message sequence.

Then, the message converter 15 reads out the conversion rule of the identified group from the conversion rule storage 13, converts the database message to be converted according to the read conversion rule, and stores the database message after the conversion into the conversion result storage 17 (step S65). Then, the processing is completed.

By carrying out the aforementioned processing, because the database message identical with the normalized expression in the conversion rule is converted to the same series of fixed character strings, it is possible to analyze these database messages as being the same database messages.

Although one embodiment of this technique was explained, this technique is not limited to this embodiment. For example, the functional block diagram of the aforementioned database message analysis support apparatus does not always correspond to the actual program module configuration.

In addition, the aforementioned table configuration is a mere example, and the aforementioned configuration is not always adopted. Furthermore, as long as the processing result does not change, the order of the steps in the processing flow may be changed. Moreover, the steps may be executed in parallel.

The aforementioned embodiment may be outlined as follows:

A database message analysis support method includes: collecting a message sequence including messages issued in response to one processing request; classifying the collected message sequence into groups of the message sequences whose simplified message sequences generated by excluding words other than predetermined reserved words from a database message that is a message including a Structured Query Language (SQL) sentence are identical, wherein said database message is included in said series of messages in said collected message sequence; generating, for each group, a normalized expression including the predetermined reserved words in the database message as fixed character strings and arbitrary character strings, which are replaced with portions other than the fixed character strings in the database message, for the database message included in the message sequence belonging to the group; and generating a rule for converting the database message considered to be identical with the normalized expression into a series of fixed character strings included in the normalized expression.

Thus, because the message sequences are classified to the groups of the message sequences whose simplified message sequences are identical and the rule for converting the database messages are generated for each group, it is possible to automatically generate appropriate conversion rules. Namely, it is possible to appropriately convert the grain size of the database message without manually preparing the rule for converting the database messages.

In addition, the database message analysis support method may further include: receiving a new message sequence including the database message to be converted; identifying a group to which the new message sequence belongs; and converting the database message to be converted to a series of fix character strings according to the rule corresponding to the identified group. For example, when there are plural database messages whose only predetermined parameters (e.g. employee number) included in the search formula of the SQL sentence are different, these database messages are converted to the same series of fixed character strings. Therefore, it becomes possible to analyze these messages as being the same database messages.

Furthermore, the aforementioned generating the normalized expression may include: judging, for each section generated by dividing the database message by the reserved word, whether or not a condition that a word or words, which are included in the section and are other than the reserved words, are a word or words common to the respective message sequences belonging to the group is satisfied; and for each of said sections for which it is judged that the condition is satisfied, setting, as the fixed character strings, the word or words, which are included in the section and are other than the reserved words, into the normalized expression. Thus, because the normalized expression includes a lot of fixed character strings, it becomes possible to convert the database message in high accuracy.

Incidentally, it is possible to create a program for causing a computer to execute the aforementioned database message analysis support method, and this program is stored into such a computer-readable storage medium or a storage apparatus such as a flexible disk, a CD-ROM, a magneto-optical disk, a semiconductor memory, or a hard disk. In addition, an intermediate processing result is temporarily stored in a storage device such as a main memory.

Figure 14:
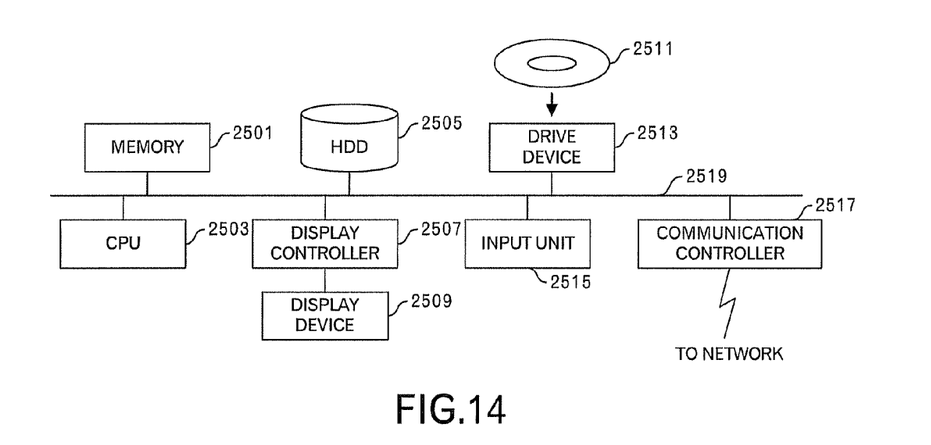
FIG. 14 is a functional block diagram of a computer.

In addition, the database message analysis support apparatus is a computer device as shown in FIG. 14. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 14. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable storage medium storing a database message analysis support program for causing a computer to carry out a procedure, the procedure comprising:
    collecting a message sequence including a series of messages issued in response to one processing request;
    classifying the collected message sequence into groups of the message sequences whose simplified message sequences generated by excluding words other than predetermined reserved words from a database message that is a message including a Structured Query Language (SQL) sentence are identical, wherein said database message is included in said series of messages in the collected message sequence;
    generating, for each group, a normalized expression including said predetermined reserved words in said database message as fixed character strings and arbitrary character strings replaced with portions other than said fixed character strings in said database message, for said database message included in said message sequence belonging to the group; and
    generating a rule for converting said database message considered to be identical with said normalized expression into a series of fixed character strings included in said normalized expression.

2. The computer-readable storage medium as set forth in claim 1, said procedure further comprising:
    receiving a new message sequence including the database message to be converted;
    identifying a group to which said new message sequence belongs; and
    converting the database message to be converted into a series of fix character strings according to said rule corresponding to the identified group.

3. The computer-readable storage medium as set forth in claim 1, wherein said generating said normalized expression comprises:

judging, for each section generated by dividing said database message by said predetermined reserved word, whether or not a condition that a word or words, which are included in the section and are other than said predetermined reserved words, are a word or words common to the respective message sequences belonging to the group is satisfied; and for each of said sections for which it is judged that said condition is satisfied, setting, as said fixed character strings, said word or words, which are included in the section and are other than said predetermined reserved words into said normalized expression.

4. A database message analysis support method, comprising:

collecting a message sequence including a series of messages issued in response to one processing request;

classifying the collected message sequence into groups of the message sequences whose simplified message sequences generated by excluding words other than predetermined reserved words from a database message that is a message including a Structured Query Language (SQL) sentence are identical, wherein said database message is included in said series of messages in the collected message sequence;

generating, for each group, a normalized expression including said predetermined reserved words in said database message as fixed character strings and arbitrary character strings replaced with portions other than said fixed character strings in said database message, for said database message included in said message sequence belonging to the group; and generating a rule for converting said database message considered to be identical with said normalized expression into a series of fixed character strings included in said normalized expression.

5. A database message analysis support apparatus, comprising:

a storage device;

a message sequence collector to collect a message sequence including a series of messages issued in response to one processing request, and to store the collected message sequence into said storage device;

a classification processor to classify the collected message sequence into groups of the message sequences whose simplified message sequences generated by excluding words other than predetermined reserved words from a database message that is a message including a Structured Query Language (SQL) sentence are identical, wherein said database message is included in said series of messages in the collected message sequence, and to generate, for each group, a normalized expression including said predetermined reserved words in said database message as fixed character strings and arbitrary character strings replaced with portions other than said fixed character strings in said database message, for said database message included in said message sequence belonging to the group; and a rule generator to generate a rule for converting said database message considered to be identical with said normalized expression into a series of fixed character strings included in said normalized expression.

* * * * *